United States Patent [19]

Isobe et al.

[11] Patent Number: 4,802,083
[45] Date of Patent: Jan. 31, 1989

[54] IMAGE READER GRAPHIC INPUT METHOD

[75] Inventors: Shinichi Isobe; Takashi Yamauchi, both of Tokyo, Japan

[73] Assignee: Fanuc Ltd, Yamanashi, Japan

[21] Appl. No.: 117,196

[22] PCT Filed: Feb. 17, 1987

[86] PCT No.: PCT/JP87/00098

§ 371 Date: Oct. 8, 1987

§ 102(e) Date: Oct. 8, 1987

[87] PCT Pub. No.: WO87/05131

PCT Pub. Date: Aug. 27, 1987

[30] Foreign Application Priority Data

Feb. 17, 1986 [JP] Japan .................. 61-032456

[51] Int. Cl.[4] .................. G05B 19/405; G05B 19/403
[52] U.S. Cl. .................. 364/191; 364/190; 364/474.24; 364/474.26; 364/474.27; 340/706
[58] Field of Search .................. 364/188–193, 364/167–171, 474, 475; 340/706; 178/18, 19, 20

[56] References Cited

U.S. PATENT DOCUMENTS

| | | | |
|---|---|---|---|
| 4,295,198 | 10/1981 | Copeland et al. | 364/191 |
| 4,429,364 | 1/1984 | Maruyama | 364/191 |
| 4,506,336 | 3/1985 | Hird | 364/520 |
| 4,550,250 | 10/1985 | Mueller et al. | 178/18 |
| 4,576,482 | 3/1986 | Pryor . | |
| 4,627,003 | 12/1986 | Kishi et al. | 364/191 |
| 4,660,148 | 4/1987 | Kishi et al. | 364/188 |
| 4,697,249 | 9/1987 | Kishi et al. | 364/190 |

Primary Examiner—Allen MacDonald
Attorney, Agent, or Firm—Staas & Halsey

[57] ABSTRACT

A graphic is prepared by providing the starting points or end points of straight lines and circular arcs with identifiable marks such as black circles. Reading the graphic by an image reader (2h). A display controller of a display unit (2d) displays each of the graphic elements and black circles on a display screen as well as inquiries calling for the coordinates of the positions at which the black circles are provided and the nature of the graphic elements between black circles. The black circles relating to inquiries are made distinguishable from other black circles by being displayed in e.g. blinking fashion. Thereafter, the coordinates of a black circle which is made to blink and the nature of a graphic element (i.e. whether the element is a straight line or circular arc) are inputted from a keyboard (2f) in response to the inquiries, whereupon the next black circle blinks and the relevant inquiry is displayed. Data are thereafter inputted in similar fashion until all of the graphic data are finally inputted.

3 Claims, 4 Drawing Sheets

IMAGE READER GRAPHIC INPUT METHOD

DESCRIPTION

1. Technical Field

This invention relates to a graphic input method and, more particularly, to a graphic input method well-suited for application to an automatic programming unit which automatically creates NC program data.

2. Background Art

Arrangements in which a modern NC unit is equipped with a "conversational-type automatic programming function" through which the unit creates NC program data while conversing with the operator are increasing in number. Such conversational-type automatic programming is disclosed in e.g. the specification of U.S. Ser. No. 642,685 filed Aug. 14, 1984, now U.S. Pat. No. 4,660,148, (entitled "Part Program Creation Method"). In order to create NC data by means of an automatic programming function, it is required that a graphic of the final shape of a workpiece be inputted to the NC unit. Accordingly, the development of a technique through which graphic data maybe inputted simply and in an easily understood manner is a topic in the art.

However, the techniques which have been put into practical use or proposed are unsatisfactory in this respect and there is room for improvement in terms of shortening training time and the time needed to perform the graphic input.

SUMMARY OF THE INVENTION

Accordingly, an object of the present invention is to provide a method of inputting graphic data simply, in an easily understood manner and in a short period of time.

A graphic is prepared by providing the starting points or end points of straight lines and circular arcs (referred to generically as "graphic elements") which constitute the graphic with identifiable marks such as black circles, and the graphic is read by an image reader. An image processor processes the data from the image reader and extracts the graphic elements and black circles. A display unit displays each of the extracted graphic elements and black circles on a display screen as well as inquiries calling for the coordinates of the positions at which the black circles are provided and the nature of the graphic elements between black circles. The black circles relating to inquiries are made distinguishable from other black circles by being displayed in e.g. blinking fashion. Thereafter, the coordinates of a black circle which is made to blink and the nature of a graphic element (i.e. whether the element is a straight line or circular arc) are inputted from a keyboard in response to the inquiries. As a result, the next black circle blinks and the relevant inquiry is displayed. Data are thereafter inputted in similar fashion until all of the graphic data are finally inputted.

DESCRIPTION OF THE PREFERRED EMBODIMENT

Figure 1:
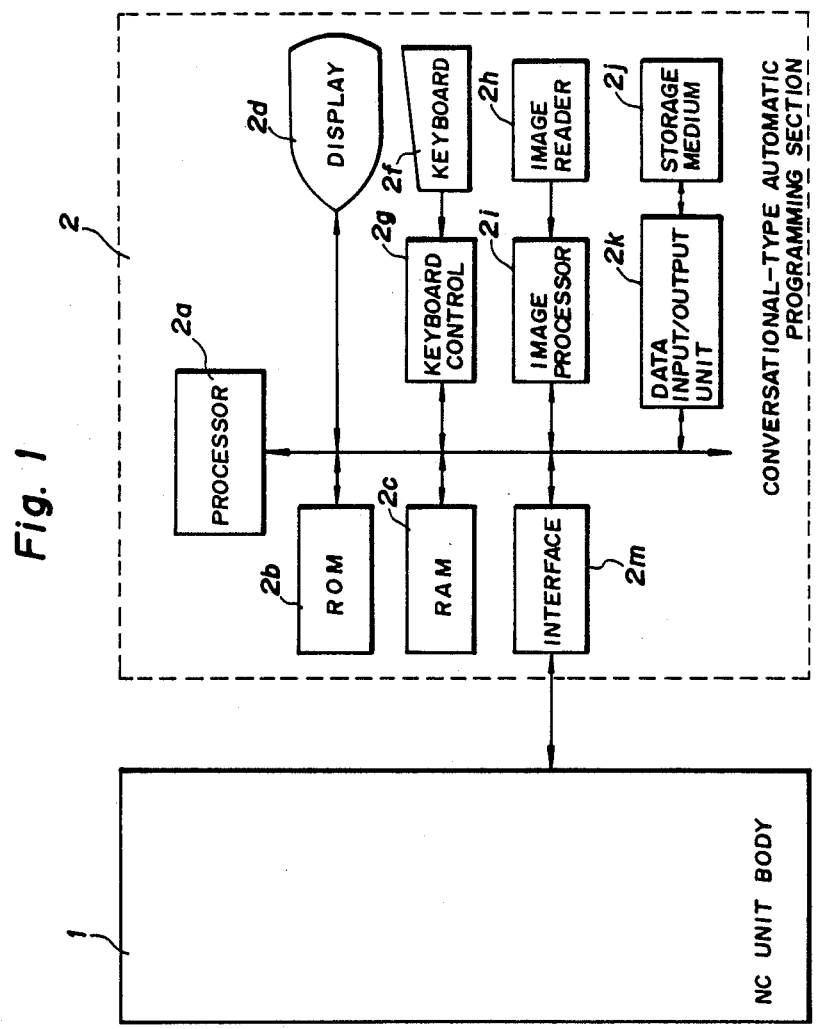
FIG. 1 is a block diagram of an NC unit equipped with a conversational-type automatic programming section.

FIG. 1 is a block diagram of an NC unit for realizing the present invention. In the Figure, numeral 1 denotes an NC unit main body, and numeral 2 represents a conversational type automatic programming section. In the conversational type automatic programming section 2, numeral 2a denotes a processor, 2b a ROM, 2c a RAM, 2d a display unit, 2f a keyboard, 2g a keyboard controller, 2h a image reader such as an image sensor, 2i an image processor, 2j an external memory medium for storing NC data, 2k a data input/output unit, and 2m an interface.

Figure 2:
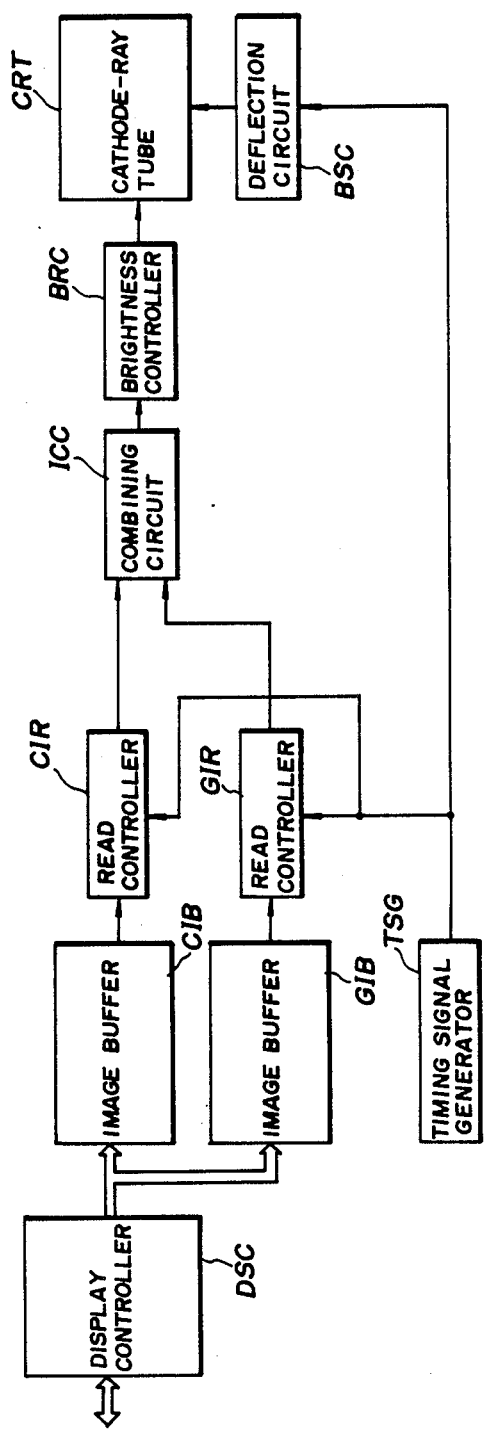
FIG. 2 is a block diagram of a display unit.

As shown in FIG. 2, the display unit 2d includes a computerized display controller DSC, an image buffer GIB for storing a graphic image, an image buffer CIB for storing a character image, a timing signal generator TSG for generating horizontal and vertical synchronizing signals, read controllers CIR, GIR for reading and outputting the images from the corresponding image buffers in synchronism with the raster scanning of a beam of a CRT, a combining circuit for combining the image signals outputted by the read controllers, a brilliance controller for performing brilliance modulation control based on the combined signal from the combining circuit, a cathode-ray tube CRT, and a deflection circuit BSC for horizontally and vertically deflecting the beam in synchronism with the timing signal outputted by the timing signal generator. Each of the image buffers has a single storage area corresponding to one pixel of the image displayed on the display screen. The arrangement is such that image data are read out of the image buffers pixel by pixel by means of the read controllers.

Figure 3:
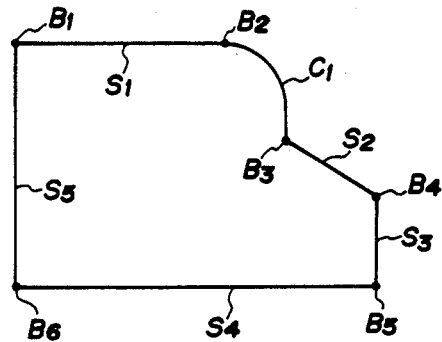
FIG. 3 is an example of a graphic used in the present invention.
Figure 5:
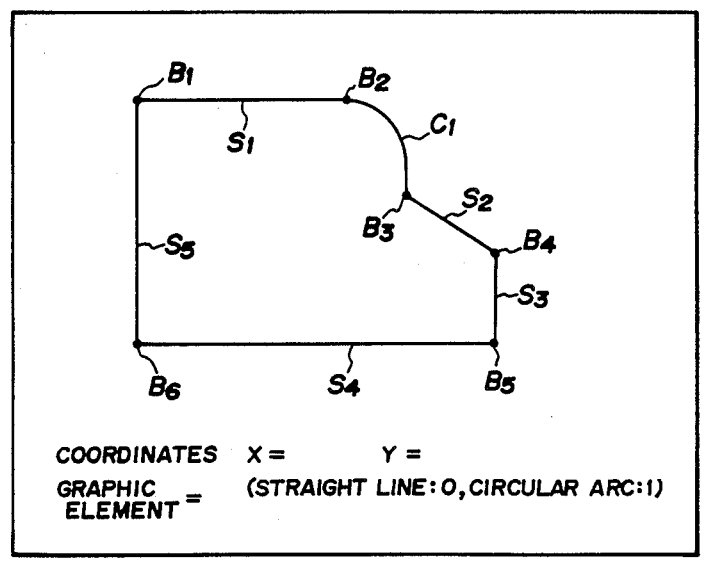
FIG. 5 is an example of a conversational display.
Figure 4:
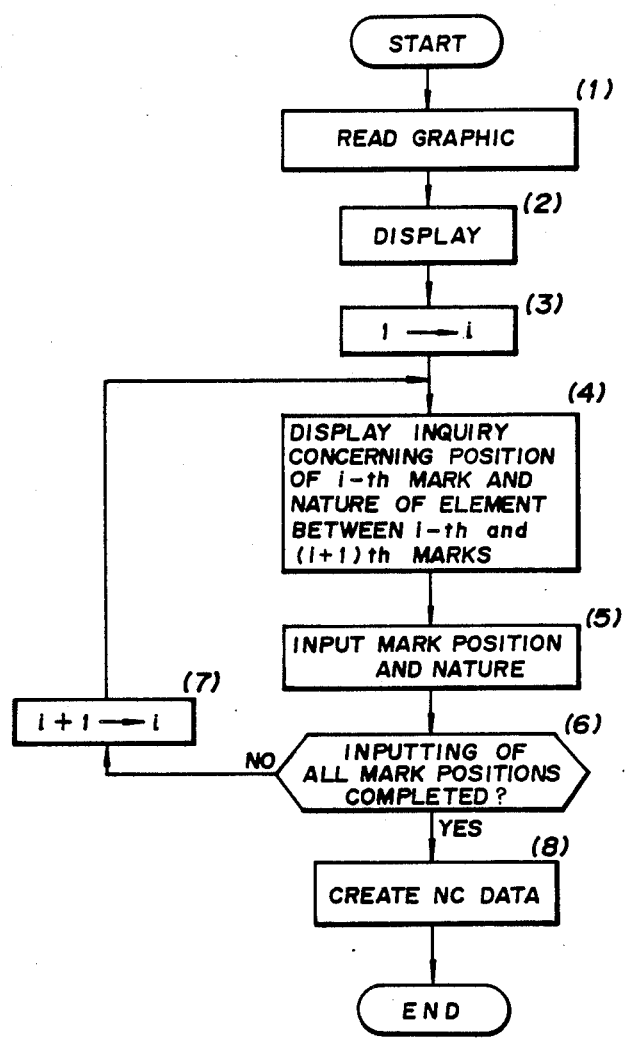
FIG. 4 is a flowchart of processing according to the invention.

FIG. 3 is an example of a graphic used in making a graphic data input in accordance with the invention, FIG. 4 is a flowchart of processing according to the invention, and FIG. 5 is an example of a conversational display. The method of the invention will now be described in accordance with FIGS. 1 through 5.

As shown in FIG. 3, the operator prepares an input graphic by drawing a tool path desired to be inputted on a sheet of paper using straight lines (S1–S5) and a circular arc (C1), and marks the starting points or end points of the straight lines and circular arc (referred to generically as "graphic elements") with e.g. black circles B1 through B6.

(1) The paper on which the graphic has been drawn is set on the image reader 2h, which proceeds to read the graphic. The image processor 2i processes the data from the image reader 2h, extracts the graphic elements and the black circles and ascertains the positions of the black circles and the number thereof.

(2) The processor 2a temporarily stores the image of the graphic elements and black circles, extracted by the image processor 2i, in the RAM 2c and then inputs the same to the display unit 2d. In response, the display controller DSC of the display unit stores the image comprising the graphic elements and black circles in the image buffer GIB, after which the graphic elements and black circles are displayed on the CRT.

(3) The processor performs the operation 1→i.

(4) Next, the processor 2a applies a command to the display unit 2d, in response to which the display controller DSC causes an i-th black circle to blink and causes an inquiry "COORDINATES X=, Y=", which calls for the positional coordinates of the black circle, and an inquiry "GRAPHIC ELEMENT=", which calls for the nature of the graphic element between the i-th and (i+1)th black circles, to be stored in the image buffer CIB and displayed on the CRT. As a result, a conversational display such as shown in FIG. 5 appears on the CRT.

Inquiries concerning the nature of a graphic element are of two types, namely (a) an inquiry as to whether the element is a straight line or circular arc, and (b) if the graphic element is a circular arc, an inquiry calling for the coordinates of the center of the circular arc or for the radius of the arc. The inquiry concerning the center or radius of the circular arc is displayed only if the graphic element is a circular arc.

(5) When the coordinates of a blinking black circle and the nature of the graphic element are inputted from the keyboard 2 in response to the inquiry, these input data are stored in the RAM 2c.

(6) In accordance with the input data, the processor checks whether the inputting of all mark positions and the natures of the segments has been completed.

(7) If the input operation is incomplete, then the operation i+1>i is performed, the next black circle is made to blink and processing is repeated from step (4) onward.

(8) If the input operation is complete, the inputting of graphic data ends, after which auxiliary data such as feed rate and spindle rpm necessary for NC data creation are inputted to eventually create NC program data, which is transferred to the NC unit main body 1 through the interface 2m. The NC program data can also be stored in the external storage medium 2j via the data input/output nit 2k.

Note that if the graphic elements S1–S5 are straight lines, the graphic element C1 is a circular arc, the coordinates of the black circles Bi (i=1, 2, ... 6) are (xi, yi) and the radius of the circular arc C1 is r in FIG. 3, then NC program data for moving a tool along the graphic from point B1 are as follows:

$$G01G92Xx_2Yy_2$$
$$G02Xx_3Yy_3Rr$$
$$G01Xx_4Yy_4$$
$$Xx_5Yy_5$$
$$Xx_6Yy_6$$
$$Xx_1Yy_1$$

In the above, G92 is a G-function instruction indicative of an absolute command, G01 is a G-function instruction indicative of linear cutting, and G02 is a G-function instruction indicative of circular arc cutting in the clockwise direction.

In accordance with the present invention as described above, the arrangement is such that a graphic is prepared by attaching identifiable marks to the starting points or end points of graphic elements inclusive of straight lines and circular arcs, the graphic is displayed on a CRT, inquiries calling for the coordinates of the positions at which the marks are provided as well as the nature of each graphic element located between marks are displayed on a display screen, and the graphic is inputted by inputting predetermined data in response to the inquiries. Accordingly, graphic data can be inputted simply and in an easily understood manner.

We claim:

1. A graphic input method for inputting graphics from an image reader and displaying graphics on a display screen of a CRT, comprising the steps of:
   preparing a graphic comprising graphic elements, each element having a nature;
   providing marks identifying starting or end points of the graphic elements;
   reading from the image reader the prepared graphic;
   displaying the read graphic on the CRT;
   displaying, on the display screen, inquiries calling for coordinates of positions of the marks and the nature of each graphic element; and
   inputting predetermined data in response to said inquiries.

2. A graphic input method according to claim 1, further comprising the step of:
   displaying the marks so that a mark related to one of said inquiries is displayed on the display screen so as to be distinguishable from other marks.

3. A graphic input method according to claim 1, wherein the nature of the graphic elements comprises one of a straight line and a circular arc, and wherein said method further comprises the step of:
   displaying on the display screen an inquiry calling for the radius or the center of a circular arc graphic element.

* * * * *